US008515886B2

(12) United States Patent
Gepperth

(10) Patent No.: US 8,515,886 B2
(45) Date of Patent: Aug. 20, 2013

(54) ARTIFICIAL COGNITIVE SYSTEM WITH AMARI-TYPE DYNAMICS OF A NEURAL FIELD

(75) Inventor: Alexander Gepperth, Offenbach (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 624 days.

(21) Appl. No.: 12/738,937

(22) PCT Filed: Nov. 28, 2008

(86) PCT No.: PCT/EP2008/010124
§ 371 (c)(1),
(2), (4) Date: Apr. 20, 2010

(87) PCT Pub. No.: WO2009/077073
PCT Pub. Date: Jun. 25, 2009

(65) Prior Publication Data
US 2010/0211537 A1    Aug. 19, 2010

(30) Foreign Application Priority Data
Nov. 28, 2007  (EP) ..................... 07121770

(51) Int. Cl.
*G06F 15/00* (2006.01)
*G06F 17/00* (2006.01)
*G06N 3/10* (2006.01)
(52) U.S. Cl.
USPC ........................................................ 706/44
(58) Field of Classification Search
USPC ........................................................ 706/44
See application file for complete search history.

(56) References Cited

U.S. PATENT DOCUMENTS

| 6,125,194 A * | 9/2000 | Yeh et al. ...................... 382/132 |
| 7,177,390 B2* | 2/2007 | Martin et al. .................... 378/25 |
| 2005/0060142 A1* | 3/2005 | Visser et al. ................... 704/201 |
| 2005/0196047 A1* | 9/2005 | Owechko et al. ............. 382/224 |

FOREIGN PATENT DOCUMENTS

| DE | 198 44 364 | 3/2000 |
| WO | 2006/072637 | 7/2006 |
| WO | WO 2006/072637 | 7/2006 |

OTHER PUBLICATIONS

'Computationally efficient neural field dynamics': Gepperth, 2008, ESANN 2008 proceedings, European symposium on artificial neural networks.*
'Dynamics of behavior: Theory and applications for autonomous robot architectures': Schoner, 1995, Elsevier, Robotics and Autonomous Systems 16 pp. 213-245.*

(Continued)

*Primary Examiner* — Kakali Chaki
*Assistant Examiner* — Peter Coughlan
(74) *Attorney, Agent, or Firm* — Squire Sanders (US) LLP

(57) ABSTRACT

Efficiently simulating an Amari dynamics of a neural field a, the Amari dynamics being specified by the equation (1) where a(x,t) is the state of the neural field a, represented in a spatial domain (SR) using coordinates x,t, i(x,i) is a function stating the input to the neural field at time t, f[.] is a bounded monotonic transfer function having values between 0 and 1, F(x) is an interaction kernel, τ specifies the time scale on which the neural field a changes and h is a constant specifying the global excitation or inhibition of the neural field a. A method comprises the step of simulating an application of the transfer function f to the neural field a. Simulating an application of the transfer function f comprises smoothing the neural field a by applying a smoothing operator (S).

12 Claims, 4 Drawing Sheets

(56) References Cited

OTHER PUBLICATIONS

Fritsch et al., "Computationally efficient neural field dynamics", Proceedings of the European Symposium on Artificial Neural Networks 2008, Apr. 23, 2008.

Erlhagen et al., "Dynamic Field Theory of Movement Preparation", Phychological Review, vol. 109, No. 3, 2002, pp. 545-572.

Wennekers et al., "Separation of spatio-temporal receptive fields into sums of Gaussians component", Journal of Computational Neuroscience, vol. 16, No. 1, Jan. 2004, pp. 27-38.

Edelbrunner et al., "Application and optimization of neural field dynamics of driver assistance", Intelligent Transportation Systems, 2001, Proceedings, IEEE, Aug. 2001, pp. 309-314.

* cited by examiner

ARTIFICIAL COGNITIVE SYSTEM WITH AMARI-TYPE DYNAMICS OF A NEURAL FIELD

The present invention is in the field of computational intelligence using neural networks.

Neural networks can be used for different technical applications, such as e.g. feature classifiers, sensor fusioning, image processing (pattern recognition), etc.

The present invention relates to artificial cognitive systems, in particular for detecting points of interest (POI) in a digital video signal, in which an Amari-type dynamics of a neural field is efficiently implemented by simulation.

TECHNICAL BACKGROUND AND PRIOR ART

Point-of-interest detectors process a supplied video signal and detect regions in the video signal which can be of interest. This the output of such detectors is a signal indicating interesting regions in the supplied video signal, which output signal is then used to control an actuator e.g. of a robot or a vehicle (automobile, plane, boat, . . . ).

POI detectors are employed ubiquitously in computer vision applications. Although the methods for POI detection differ greatly, it is nevertheless commonly accepted that POI detection should be among the first stages of any vision-based image understanding system. This is based on the fact that a parallel, full-blown analysis of all regions of the image is infeasible in addition to being unnecessary due to the fact that the relevant information content of images is usually concentrated on few regions only.

It is now quite universally agreed that the presence of semantically relevant quantities such as, e.g., objects or persons, can be detected in an image based on quite simple local image properties but possibly in a situation- and task-dependent manner. Saliency map models (which are formulated according to biological vision processing principles) are capable of performing exactly these functions, yielding POIs similar to those human or animal vision might detect.

Typical operations that use the detected interest points are segmentation, object classification, region tracking and gaze or actuator control. All of these operations can be computationally expensive; it is therefore imperative that the supplied points of interest are few, yet of sufficient relevance for the targeted application domain in order not to consume computing time unnecessarily; on the other hand, it may be important that no application relevant quantities are missed by the point-of-interest detection. Especially in the domain of "intelligent vehicles", a missed detection of, e.g., pedestrians can have grave consequences.

For this reason, saliency map models have recently received strong scientific attention since they have the potential to emulate human performance which is far superior to present-day technical approaches to point-of-interest detection with respect to the criteria that were just mentioned.

Virtually all of the literature on the subject agrees that the performance of saliency maps increases as the number of measurements increases; it is therefore of considerable practical interest to be able so simulate large numbers of Amari dynamics-governed systems in real-time. The requirement of real-time capability becomes even more important when taking into account that computing hardware operating in cars is and will be limited in processing power due to robustness and power consumption requirements.

There are also many implementations in technical systems aiming at similar-to-human point-of-interest detection which use the Amari dynamics (AD) technique or trivial derivations thereof, see, e.g. [Conradt, J, Simon, P, Pescatore, M and Verschure, P "Saliency Maps Operating on Stereo Images Detect Landmarks and their Distance", Proceedings of the International Conference on Neural Networks, 2002; Fix, J, Vitay, J, Rougier, N "A Computational Model of Spatial Memory Anticipation during Visual Search", Proceedings of the Anticipatory Behavior in Adaptive Learning Systems conference, 2006; Itti et al., op. cit.; Goerick, C. et al., "Towards Incremental Hierarchical Behavior Generation for Humanoids", In IEEE-RAS International Conference on Humanoids, 2007]. However, these publications are based on a standard simulation of Amari dynamics, resulting in significantly lower processing speeds. This is a critical issue in point-of-interest detection since it usually has to be performed in real-time.

The simulation of Amari dynamics (AD) on a digital computer is quite expensive from a computational point of view, which is why real-time applications of larger systems of coupled Amari dynamics (AD) are not feasible up to now.

The simulation of Amari dynamics (AD) on a digital computer requires numerically solving a nonlinear differential equation for one- or two-dimensional neural fields (see, e.g., [Erlhagen, W, Schöner, G "Dynamic field theory of movement preparation", Psychological Review 109:545-572, 2002] for an introduction to the concept of neural fields) which is related to Amari dynamics [Amari, S "Dynamics of pattern formation in lateral-inhibition type neural fields", Biological Cybernetics 27:77-87, 1977; Amari, S "Mathematical foundations of neurocomputing", Proceedings of the IEEE 78: 1443-1463, 1990], requiring significantly less computational resources than previous approaches. At the same time, the invention allows to incorporate the most common types of boundary conditions when solving the differential equation without impairing computational speed, which is of importance in many applications.

One formulation of the differential equation for Amari dynamics (AD) reads $$\tau \dot{a}(\vec{x},t) = -a(\vec{x},t) + i(\vec{x},t) + F(\vec{x}) * f[a(\vec{x},t)] + h \qquad (1)$$

where $a(\vec{x},t)$ is the function to be found, i.e., the state of the neural field, $i(\vec{x},t)$ is a known function stating the input to the neural field, f[.] is a bounded monotonic, usually nonlinear function with values between 0.0 and 1.0 called "transfer function", $F(\vec{x})$ stands for a function called the "interaction kernel", specifies the time scale the neural field can change on, and h is a constant specifying the global excitation or inhibition of the field. The operator "*" represents a spatial convolution operation defined on function spaces as $$(f*g)(x) = \int f(\xi)g(x-\xi)d\xi \qquad (2)$$

In order to simulate equation (1) numerically, the variables $\vec{x},t$ may be discretized using step sizes x, y, t. By doing this, the convolution is transformed to a discrete convolution operation. The correct choice of x, y, t is nontrivial and must be performed according to the accuracy requirements on the desired solution. Especially when discretizing the time dimension, variable step sizes may be employed. Within the scope of the presented invention, however, the choice of correct step sizes is not considered since it may depend on the requirements of a particular application. It is assumed that that step sizes have been set to fixed values which are compatible with all application requirements. At least for the time variable, the use of variable step sizes does not invalidate any aspect of this invention. The term "neural field" will refer to the discretized version of the continuous neural field from now on.

The function $F(\vec{x})$ is usually concentrated in a small region around the origin and can thus be expressed as a discretized, finite convolution filter of a certain size. An issue here is that the discrete convolution operation is very computationally costly, since it requires at least N*M multiplications, where N is the number of discretized points of the neural field, and M the corresponding number for the interaction kernel. In case of two-dimensional neural fields, the problem becomes worse since N scales quadratically with the neural field size, and M is usually related to that size.

For reasons of the stability of solutions, it is always asserted in the literature [6, 7] that the input to the neural field changes on a slower time scale than the neural field itself. When solving the differential equation for the neural field iteratively, this is usually expressed by keeping $i(\vec{x},t)$ constant for K time steps (or "iterations") before supplying a new value, so the neural field has always sufficient time to converge to an equilibrium solution with the current input before a new input is presented.

Usually, Amari dynamics (AD) is simulated in the space representation (SR) using the method of separable filters [Jaehne, W "Digital image processing", 6th edition. Springer Verlag Berlin, Heidelberg, New York, 2005] for speeding up the convolution process, as detailed, e.g., in the appendix of the article by Erlhagen et al. [op.cit.]. However, since the difference-of-Gaussian function that is generally used for the interaction kernel is not itself separable (Gaussian functions are separable, but not their sum or difference), the speed-up that can be gained is limited.

German patent application DE 19 844 364 discloses using neural networks to learn the attractors of a dynamical system governed by Amari dynamics (AD) in order to avoid the computationally costly exact simulation. However, this approach requires a significant training phase prior to use, and it is not guaranteed that a qualitative behavior identical to true Amari dynamics (AD) will result due to the limited learning and generalization capabilities of neural networks.

It is therefore an object of the present invention to efficiently implement a neural network with Amari dynamics. It is a further object, to provide a more efficient method and a device for detecting points of interest in a video signal, based on a neural network simulation.

BRIEF SUMMARY OF THE INVENTION

This object is achieved by a method and a device according to the independent claims. Advantageous embodiments are defined in the dependent claims.

The invention achieves the implementation of a Amaric dynamics neural network with less computational resources.

Using the inventive simulation method, a system is described that efficiently detects points of interest in a video signal.

The presented invention implements a method by which the speed advantages of computing convolutions in the Fourier representation are exploited while at the same time taking care of the application of the transfer function and the flexible treatment of boundary conditions. Compared to prior art, a significant speed gain can be achieved in this way while allowing to apply arbitrary transfer functions and the most common type of boundary conditions. As mentioned before, the issues of speed and boundary conditions are very relevant for the intended application domain of point-of-interest detection.

It is proposed to employ the advantages of the presented method, i.e., high-speed iteration of Amari dynamics (AD) and the correct treatment of boundary effects, for visual point-of-interest detection in mobile robots or cars. Especially, techniques known as saliency maps are suited for this, and it is proposed to select suitable models of saliency maps and to enhance those by employing MAD, thereby enabling real-time use on restricted hardware as it is often encountered in the domains of mobile robotics and cars. The various cited approaches to the saliency map technique (see Prior Art section) are by no means in agreement on all points, and indeed are not part of the presented invention. They agree, however, on using Amari dynamics (AD) as a central computational element. Therefore, in the following, the simplest possible saliency map model that makes use of Amari dynamics (AD) is described; this should be understood to cover the use of Amari dynamics (AD) in all of the cited models.

The presented invention uses a mathematical method known as discrete Fourier transform (DFT) to speed up calculations and reduces the computational cost associated with it by exploiting intrinsic properties of a slightly modified version of Amari dynamics (AD).

The presented method is superior in terms of computation speed with respect to present implementations of Amari dynamics (AD) simulation, and the modified Amari dynamics (AD) exhibit qualitatively identical behavior to the real Amari dynamics (AD). In addition, the proposed method also addresses the technical problem of border effects, usually a difficult issue when using the Fourier representation. Both issues are very relevant when constructing point-of-interest (POI) detectors, and thus the present invention as able to extend the state-of-the-art.

Using the presented technique, it is possible to implement large systems of coupled Amari-type dynamical systems in real-time on standard computers. In other words, the method of the invention may be implemented on a computer. If there is hardware acceleration for performing the DFT (like, e.g., on modern graphic cards), the resulting gain in speed with respect to standard approaches will be even higher. In the presented case of point-of-interest detection in video images, this speed gain makes it possible to perform the computationally expensive process in real-time using limit computer hardware.

The presented invention can be used without requiring a training phase, and it simulates the modified Amari dynamics (AD) fully, thus obtaining a behavior that is qualitatively identical to Amari dynamics (AD) in all cases while maintaining low computational cost at the same time.

The proposed modified Amari dynamics (AD) is therefore much more effective in reducing computational effort while retaining the qualitative performance properties of Amari dynamics (AD).

DESCRIPTION OF THE FIGURES

These and other aspects and advantages of the present invention will become more apparent when studying the following description of an embodiment of the invention, in connection with the annexed drawing, in which.

DETAILED DESCRIPTION

Figure 1:
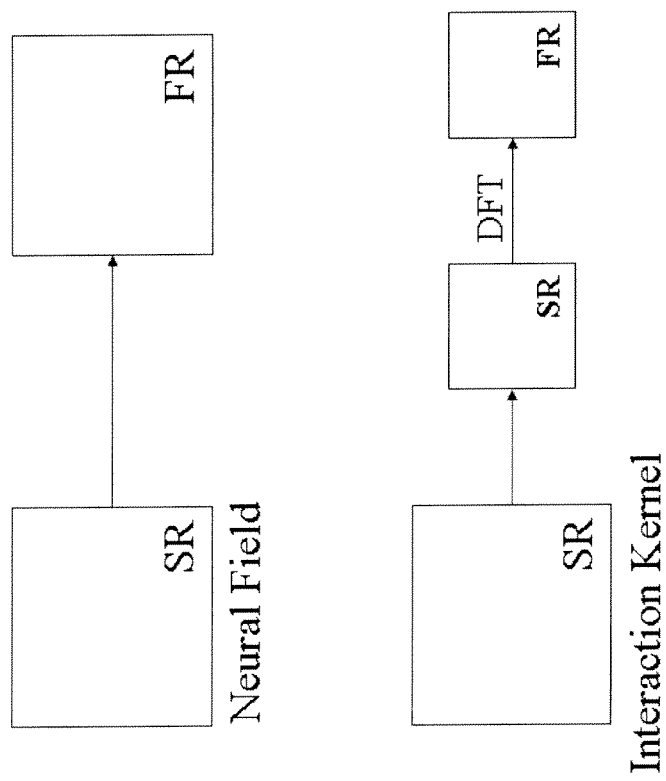
FIG. 1 shows the initialization steps of a method according to an embodiment of the invention.

FIG. 1 shows the initialization steps of a method according to an embodiment of the invention. The neural field is initialized in the space representation (SR) and then transformed to the FR. Equally, the interaction kernel is defined in the space representation (SR) before being down-sampled and transformed to the FR. (I)DFT stands for the (inverse) discrete Fourier transform.

The crucial issue in efficiently solving the given differential equation is, as was explained before, the computation of the convolution operation.

A discrete convolution may be computed much more efficiently if the neural field and the interaction kernel are transformed to the so-called "Fourier representation" (FR) by application of a transform known as the Discrete Fourier Transform (DFT). If more than one interaction kernel is to be convolved with the neural field, or if the same convolution kernel is repeatedly applied to the neural field, significant speed gains are possible since the transformation of the interaction kernel to the Fourier representation needs be computed only once (since it is time independent), and only one transformation and one back-transformation of the neural field are necessary for performing an arbitrary number of computationally cheap convolutions.

Consequently, it is proposed to perform all computations of one iteration in the Fourier representation. This means effectively that the state of the neural field, after being initialized and transformed to Fourier representation once, is maintained in the Fourier representation and transformed back to a space representation (SR) only when a result must be given. In order for this to work, all other quantities appearing on the right-hand side of the Amari differential equation must be transformed to or maintained in the Fourier representation, which is trivial in the case of the neural field state itself (is already in FR) and the global excitation/inhibition as well as the interaction kernel (both are constant in time, can be pre-transformed to the Fourier representation).

However, the input to the neural field cannot be precomputed since it is time-dependent, albeit on a slower time scale than the neural field itself. As detailed before, it may be assumed to be constant for at least K iterations at a time. Therefore, it must be transformed to the Fourier representation only when it actually contains new information which happens at every K-th step. Thus, the computational cost of the transform is distributed over K iterations. Since K is usually chosen quite large, the cost of the transform is effectively reduced.

The problems with this approach in the context of simulating Amari dynamics (AD) are twofold: first of all, a convolution in the Fourier representation implicitly enforces cyclic boundary conditions, i.e., every edge pixel (discretized neural field element) is treated to be adjacent to the pixel at the opposite edge of the neural field, which is not always desirable. Secondly, the application of the transfer function is, except for very simple functions, not possible in the FR. The issue of boundary conditions is important since an inappropriate treatment of boundaries will impair the homogeneity of the neural map, i.e. areas close to the borders will exhibit different behavior than areas far from edges. The correct application of a transfer function is a critical issue, making the differential equation nonlinear and therefore introducing qualitatively new desirable dynamics.

Figure 2:
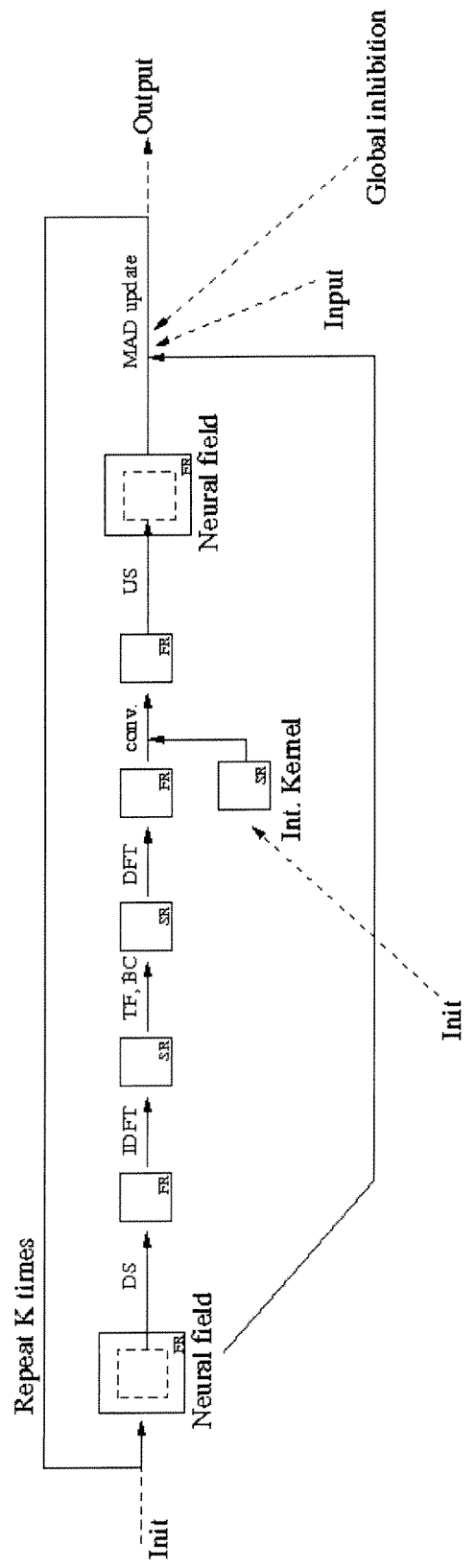
FIG. 2 shows an iteration of a method according to an embodiment of the invention.

FIG. 2 shows an iteration of a method according to an embodiment of the invention. DS stands for "down-sampling", US for "up-sampling", (I) DFT for the (inverse) Fourier transform, TF for the application of the transfer function, BC for the application of boundary corrections. MAD stands for "modified Amari dynamics". The arrows labeled by "Init" symbolize that previously computed quantities are used, see FIG. 1. As explained in the text, iterations are repeated K times before a new input is applied to the neural field. This is also the time that a field output can be computed by re-transforming the neural field back into the SR.

According to one aspect of the invention, it is proposed to speed up the solution of the differential equation by performing the time-critical convolution operations in a size-reduced Fourier representation, while applying the transfer function (and possibly boundary conditions) to a size-reduced spatial representation (SR).

For this purpose, the Amari differential equation must be slightly modified; it can be shown, however, that the modified differential equation reproduces the intrinsic properties of the original equation. It is proposed to apply a smoothing operation to the neural field prior to applying the transfer function, for reasons that will be explained below. The modified Amari equation thus reads as follows, where $S(\vec{x})$ is a smoothing kernel designed to remove high spatial frequencies from the field:

$$\tau \dot{a}(\vec{x},t) = -a(\vec{x},t) + i(\vec{x},t) + F(\vec{x})*f[S(\vec{x})*a(\vec{x},t)] + h \quad (3)$$

The smoothing operation makes it possible to transform the neural map to a smaller size in the FR: by removing a determined amount of high frequencies from an image, it is possible to reduce its size without introducing errors and artifacts; an identical reasoning applies in the described case, where the low-pass properties of the smoothing kernel are exploited to reduce the size of the neural field. Since the field is represented in the Fourier representation, perfect smoothing (the removal of all frequencies higher than a given threshold) may simply be effected by cutting out a central part of the neural field, corresponding to the fact that the ideal smoothing filter in the Fourier representation is a box centered at the origin with which the neural field is multiplied.

From the reduced-size, smoothed neural field in the Fourier representation, a reduced-size representation in the space representation (SR) can be obtained by inverse Fourier transform which can be performed very efficiently due to the size reduction. Now, the transfer function and the boundary treatment can be applied in the space representation (SR) where they are efficient and feasible. Subsequently, the result of these operations is trans-formed back into a size-reduced Fourier representation, and the convolution with the interaction kernel can be performed in that size-reduced Fourier representation provided it does not contain higher frequencies than the size-reduced Fourier representation itself. In the Fourier representation, this statement corresponds to the equivalent statement that the interaction kernel in the Fourier representation must be band-limited to a region no larger than the smoothing filter. This is possible due to the usually chosen interaction kernel: a difference-of-Gaussian function centered at the origin, given as $$f(\vec{x}) = G_{\sigma_E}(\vec{x}) - G_{\sigma_I}(\vec{x}), \quad G_\sigma(\vec{x}) = \frac{1}{2\pi\sigma}e^{-\left\{\frac{\vec{x}^2}{2\sigma^2}\right\}}, \quad \sigma_E < \sigma_I \quad (4)$$

It is known from elementary image processing that such a function will be band-limited in the Fourier representation, depending only on the variance of the Gaussian functions. In practice, this variance is often determined by application demands; for this reason, it is easier to adapt the smoothing filter to fit the interaction kernel rather than the other way round.

After performing the convolution, the neural field can be up-sampled to the original size without errors due to the previous reasoning. The expansion procedure in the Fourier representation is a simple copying operation and thus very efficient. The expanded result can now be used to perform the whole iteration step entirely in the FR. The updated state of the neural map remains in the Fourier representation to be used in the next iteration step.

The factor σ by which the convolution result can be shrunk depends on the parameter σ of the interaction kernel. Using common values as a guideline, a reduction by a factor of 2 in each dimension of the neural map is to be expected. For two-dimensional neural maps, this amounts to an at least 4-fold reduction of the computational cost of the transform from and to the SR. Higher values of σ lead to even higher size reduction factors.

According to a third aspect of the invention, a different type of boundary condition is applied when performing convolution operations: so-called "zero-padding" boundary conditions. This is in contrast to the cyclic boundary conditions implicitly used by convolutions in the Fourier representation (this follows from the theory of the Fourier representation). Zero padding amounts to treating the rectangular neural field as being enclosed by zero-valued entries from all sides. Convolution operations that transcend the boundaries of the field simply process those zero entries. This is in contrast to e.g. periodic boundary conditions where convolutions that transcend the boundaries use pixel values from the opposite sides of the neural field, i.e. the neural field is continued periodically in all directions. In other words, zero-padding boundary conditions imply that, wherever an applied convolution filter exceeds the neural field dimensions, zero values are used instead of "missing" entries (see, e.g., [Jaehne, W. op.cit.]).

In order to apply these boundary conditions, certain operations must be performed before the iterations start, as well as at each iteration. First of all, the initial state of the neural field must be enlarged in each spatial dimension, initializing undefined empty regions with zero values. The enlargement must be, at each border, more than half of the size of the convolution filter of the interaction kernel. This can be done at initialization, i.e., before any iteration steps are performed.

Secondly, every K iterations, the (new) input to the neural field must be equally enlarged. Thirdly, at each iteration, the down-sampled neural field must be multiplied point-wise with a mask which counteracts the effect of the edge introduced by the enlargement on the convolution of the neural field with the interaction kernel. Since this is a linear operation, it commutes with the interaction kernel convolution which can therefore be safely performed afterwards, as described previously.

Each of these operations involves point-wise multiplications or copying, neither of which are time-consuming. Furthermore, performing the boundary treatment in the down-sampled space representation (SR) is computationally still more favorable.

The proposed invention can be beneficially applied in all applications where large numbers of systems evolving according to Amari dynamics (AD) are required. Especially in the field of intelligent autonomous systems (which may, for example, be cars or autonomous robots), such applications are encountered with increasing frequency, e.g., in behavior control [Edelbrunner, H, Handmann, U, Igel, C, Leefken, I and von Seelen, W (2001). Application and optimization of neural field dynamics for driver assistance. In The IEEE 4th International Conference on Intelligent Transportation Systems (ITSC 01), pages 309-314.] or visual image processing. In the latter case, the work on saliency maps [Conradt, J. et al., op. cit.; Fix, J. et al., op. cit.; Hamker, F., op. cit.; Itti, L and Koch, C op. cit.; Deco, G., & Zihl, J. "Neurodynamical mechanism of binding and selective attention for visual search", Neurocomputing, 32-33, 693-699, 2000; Frintrop, S., op. cit.; Michalke, T. et al., op. cit.] deserves special attention as it requires (depending on the chosen model) the simulation of comparatively large numbers of two-dimensional "feature maps" which evolve according to Amari dynamics (AD). Saliency map model are point-of-interest detectors, emulating human performance of finding the most currently conspicuous locations in an image, possibly in a task- and situation dependent manner. For this purpose, a number of approximately independent measurements is performed on the sensed image and later combiped according to biologically inspired strategies which in many models involve the simulation of Amari dynamics (AD).

Figure 3:
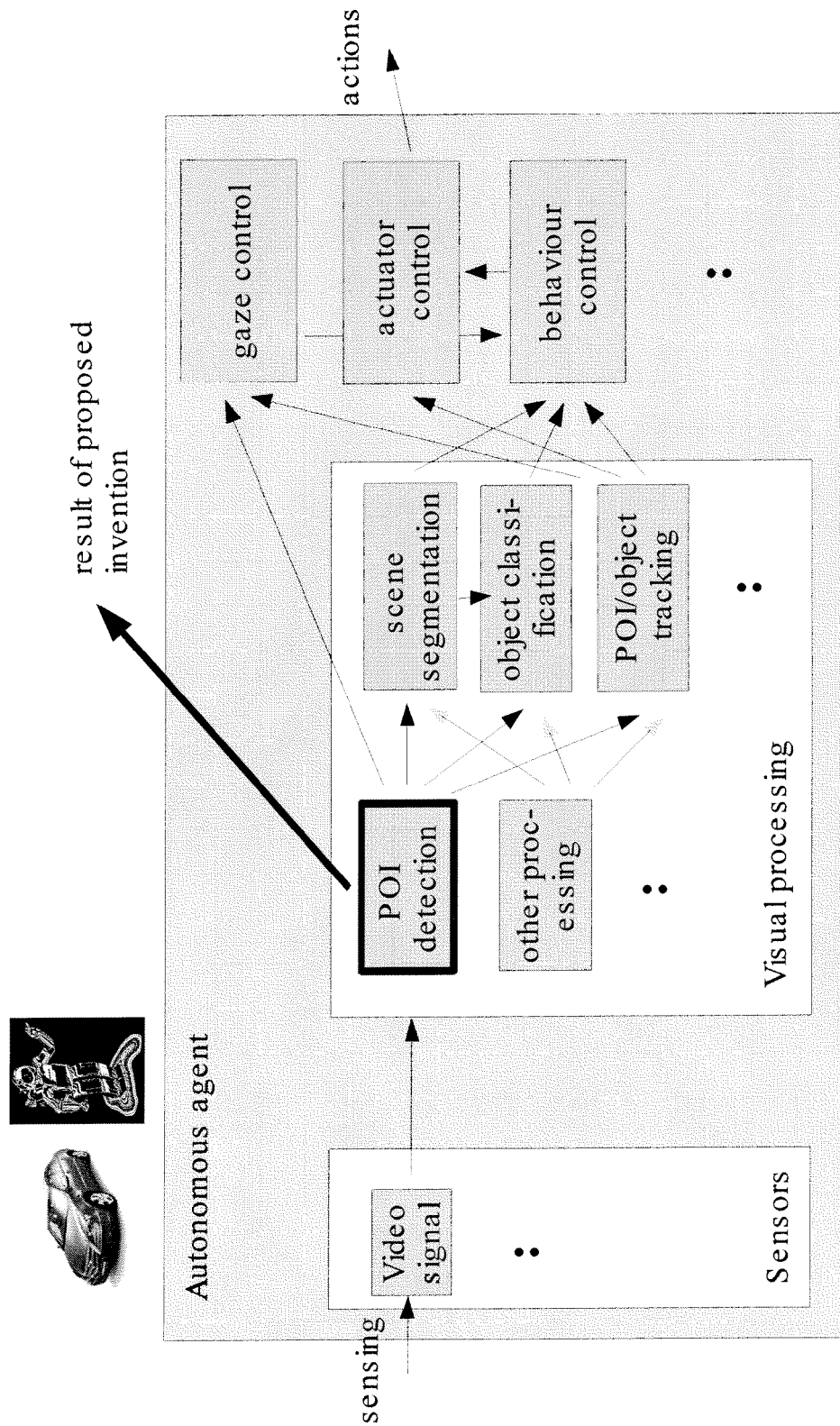
FIG. 3 shows a flowchart of a point-of-interest detection method embedded into an autonomous agent, e.g. a car or a mobile or humanoid robot.

FIG. 3 shows a flowchart of a point-of-interest detection method embedded into an autonomous agent, e.g. a car or a mobile or humanoid robot. Arrows represent data flows.

Not all possible components of autonomous agents are shown. The central role of point-of-interest detection for various following processing steps is clearly visible. It should also be transparent that the impact of poor point-of-interest detection performance will affect the whole system at many levels of abstraction. The right-most arrow represents the effect of actions of the agent on the world.

Figure 4:
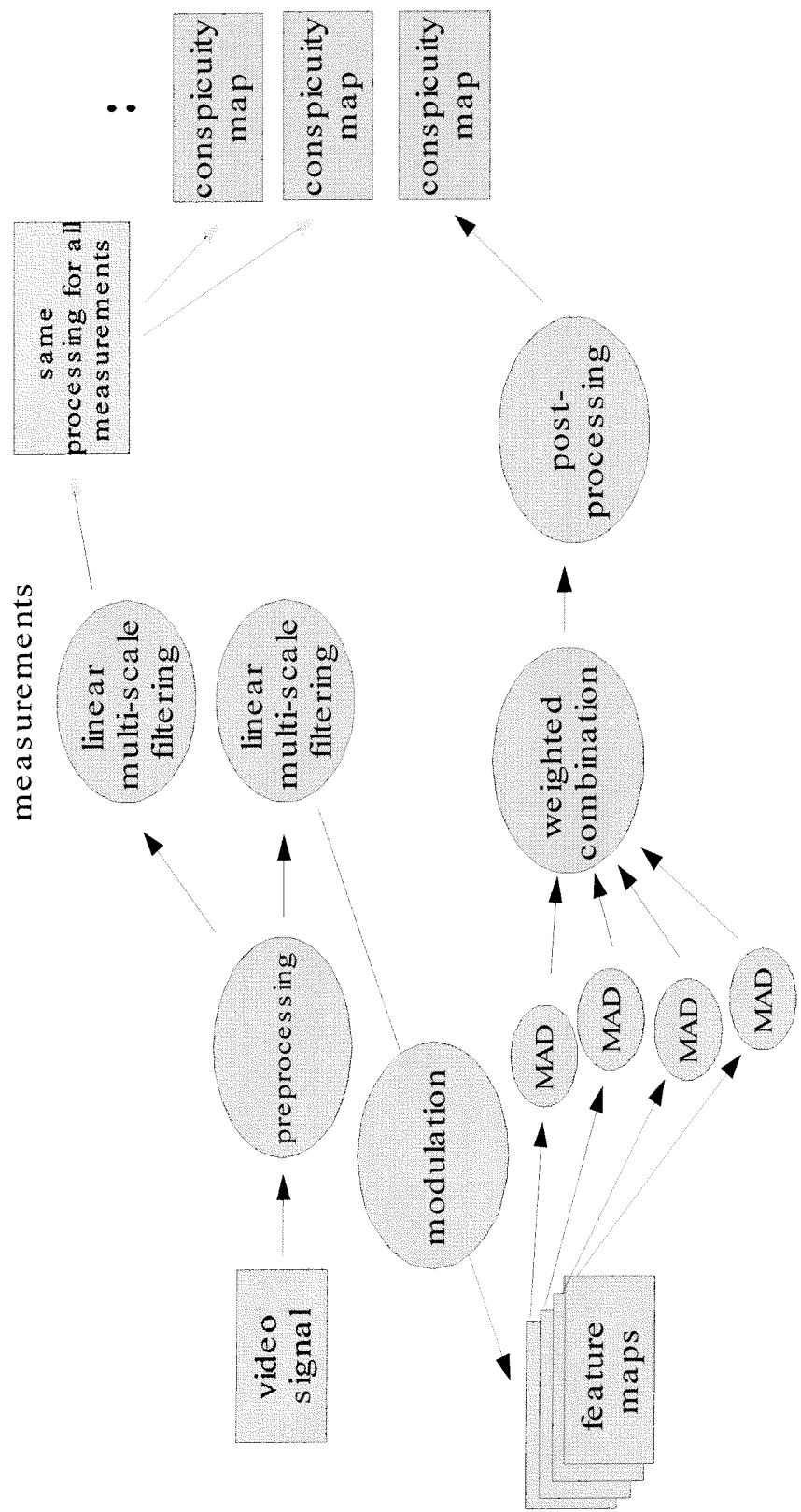
FIG. 4 shows the schematics of a simplified saliency map model using a method according to an embodiment of the invention for point-of-interest detection.

FIG. 4 shows the schematics of a simplified saliency map model using a method according to an embodiment of the invention for point-of-interest (POI) detection.

It is assumed that the process that is shown here for generating a conspicuity map out of one measurement is repeated for all measurements. The conspicuity maps are then combined, usually by weighted summation, to form the final saliency map. Points of interest are encoded as local maxima in the saliency map and can thus be easily extracted. All processing steps indicated here by circles are to be understood as placeholders w.r.t. implementations of [8-14].

The proposed invention is ideally suited for use with saliency map models for an additional reason which is, as mentioned before, the correct treatment of boundary conditions. Since saliency map models usually analyze the image at multiple spatial resolutions (or, equivalently, images down-sampled to different sizes), boundary effects cannot be ignored especially at very low resolutions. The usual treatment would be to simply exclude the corrupted border areas from consideration; however, at low resolutions, this would mean excluding almost all of an image area which is clearly undesirable. Due to the correct boundary treatment in MAD, saliency map models can work reliably even at very low resolutions.

Feature maps are usually generated by applying the same linear filter but at multiple spatial resolutions. This means that feature maps can have different sizes, resulting in a stringent need for correct boundary treatment in MAD, especially at small feature map sizes. Pre- and postprocessing stages were included for the sake of generality: they may include image rectification/contrast normalization/noise removal in the case of preprocessing, and maxima enhancement or thresholding in the case of postprocessing. The modulation step may include multiplying all feature maps by scalar values to influence the behavior of the MAD. The weighted combination step scales all feature maps to a common size and then combines them, usually by weighted summation, where the weights may reflect preferences for certain image properties due to the current application, situation or context.

Finally, the number of measurements can be quite large, as well as the number of feature maps per measurement. Therefore, the total number of modified Amari dynamics (MAD) processes to be simulated can be large for realistic saliency map models.

In the following, steps according to further embodiments of the invention are listed.

A method for simulating systems evolving according to modified AD on a digital computer or an analog hardware device, maintaining an internal state in the FR and using a reduced-size SR and FR to perform the necessary computations, wherein the parameters are
- the number of simulation steps to be performed for constant input: K and
- the variance of the Gaussian filters in the interaction kernel, given by and 2, may comprise the following steps:
1. Initialization of the internal state in the SR
2. Transformation to the FR
3. Each time an input is presented:
   3.1. Transformation of the input into the FR
   3.2. K-fold repetition of an iteration step according to the equations of modified AD, making use of the FR, a reduced-size FR and a reduced-size SR
   3.3. Re-transformation of the internal state into the SR
   3.4. Return of the re-transformed internal state to the calling process In a further embodiment, this method may be modified in that the iteration step may be a sequence of the following operations:
1. Determination of the correct smoothing filter size, depending on the size of the interaction kernel of the modified AD
2. computation of a down-sampled version of the interaction kernel, where the size depends on the chosen smoothing filter
3. application of the perfect smoothing filter to the neural field in the FR
4. down-sampling the result of step 3 to a size given by the size of the smoothing filter in the FR
5. transformation of the result into a size-reduced SR
6. application of boundary correction and transfer function in the SR
7. inverse transformation of the result of step 6 into a size-reduced FR
8. performing the convolution of the result of step 7 with the size-reduced interaction kernel of step 2
9. up-sampling of the result of step 8 to the original neural field size
10. updating the internal state of the neural field according to the equations of modified AD using the result of step 9

Both methods may implement zero-padding instead of periodic boundary conditions when performing convolutions.

The initialization step of the first method may perform an enlargement of internal state prior to transformation to the FR. The internal state may be enlarged by a quantity determined from the parameter, see step 2 in method 1. Furthermore, step 3.1 may perform an identical enlargement of the input prior to transformation to the FR. All other internal and temporary states may be chosen according to the new sizes of input and internal state. When enlarging, areas not covered by the neural field are filled with values of zero. Boundary treatment is performed in the size-reduced SR by point-wise multiplication with a correction function.

A further embodiment of the invention may comprise operating the above-described methods in a mobile robot or in a car, for approximately simulating large numbers of systems evolving according to AD. Finally, the method may also be operated in a mobile robot or in a vehicle such as e.g. a car or a plane, using the modified AD technique to operate saliency map models of visual processing.

The invention claimed is:

1. A computer implemented method for implementing a neural field a with simulated Amari dynamics, the Amari dynamics being specified by the equation $$\tau \dot{a}(\vec{x},t) = -a(\vec{x},t) + i(\vec{x},t) + F(\vec{x}) * f[a(\vec{x},t)] + h$$

where $\vec{x}$ is a vector is a spatial coordinate in at least two dimensions, t is a temporal coordinate indicating a time at which the neural field a is evaluated, $\dot{a}$ is a derivative of the neural field a with respect to the coordinate t, $a(\vec{x},t)$ is a state of the neural field a, represented in a spatial domain (SR) using coordinates $\vec{x}$, t $i(\vec{x},t)$ is a function stating an input to the neural field a at time t, f[.] is a bounded monotonic transfer function having values between 0 and 1, $F(\vec{x})$ is an interaction kernel, τ specifies a time scale on which the neural field a changes and h is a constant specifying a global excitation or inhibition of the neural field a, the method comprising:

simulating an application of the transfer function f to the neural field a in a discrete convolution, via a computing device, wherein a total number of iterations for an evolution of a simulation is determined by the application, and the step of simulating the application of the transfer functions f comprises smoothing the neural field a by applying a smoothing operator (S), and the state of the neural field a and the interaction kernel $F(\vec{x})$ are transformed in a Fourier representation in order to carry out the discrete convolution, wherein the step of applying a smoothing operator (S) to the neural field a comprises:

i) a transforming the neural field a to a frequency domain (FR);

ii) transforming an input to the neural field a to the frequency domain (FR);

iii) cutting out a central part of the obtained representation in the frequency domain F(FR);

iv) transforming the central part back to the spatial domain (SR);

v) applying the transfer function f to the obtained representation of the central part in the spatial domain (SR);

vi) transforming the result of applying the transfer function back to the frequency domain (FR);

vii) multiplying the obtained representation of the result in the frequency domain (FR) with the interaction kernel (F);

viii) upsampling the result of multiplying with the interaction kernel (F);

ix) performing the remaining update steps in the up-sampled frequency domain (FR);

x) transforming the neural field a obtained from upsampling the result to the spatial domain (SR); and xi) outputting an actual state of the neural field a transformed to the spatial domain, wherein steps iii to viii are repeated k times before a new input is applied to the neural field a, k being a positive integer.

2. The method according to claim 1, wherein the size of the central part to be cut out is determined based on a frequency content of the interaction kernel (F).

3. The method according to claim 2, wherein the size of the interaction kernel is adapted to the size of the central part.

4. The method according to claim 1, further comprising applying boundary conditions to the result of applying the transfer function.

5. Method according to claim 4, wherein the step of applying boundary conditions comprises zero padding.

6. Method according to claim 1, wherein the neural field is a saliency map.

7. Use of a method according to claim 1 for detecting points of interest in a digital video signal.

8. A neural network in which Amari dynamics are implemented by simulation, the Amari dynamics being characterized by the equation $$\tau \dot{a}(\vec{x},t) = -a(\vec{x},t) + i(\vec{x},t) + F(\vec{x}) * f[a(\vec{x},t)] + h$$

where $\vec{x}$ is a vector is a spatial coordinate in at least two dimensions, t is a temporal coordinate indicating a time at which the neural field a is evaluated, $\dot{a}$ is a derivative of the neural field a with respect to the coordinate t, $a(\vec{x},t)$ is a state of the neural field a, represented in a spatial domain (SR) using coordinates $\vec{x}$, t $i(\vec{x},t)$ is a function stating an input to the neural field a at time t, f[.] is a bounded monotonic transfer function having values between 0 and 1, $F(\vec{x})$ is an interaction kernel, $\tau$ specifies a time scale on which the neural field a changes and h is a constant specifying a global excitation or inhibition of the neural field a, the device comprising means for simulating an application of the transfer function f the neural field a in discrete convolution, wherein a total number of iterations for an evolution of a simulation is determined by the application, and the means for simulating an application of the transfer function f comprises means for smoothing the neural field a by applying a smoothing operator (S), and means are provided for transforming the state of the neural field a and the interaction kernel $F(\vec{x})$ are transformed in a Fourier representation in order to carry out the discrete convolution;

wherein the means for smoothing the neural field a by applying a smoothing operator(S) comprises:
i) a transforming the neural field a to a frequency domain (FR);
ii) transforming an input to the neural field a to the frequency domain (FR);
iii) cutting out a central part of the obtained representation in the frequency domain F(FR);
iv) transforming the central part back to the spatial domain (SR);
v) applying the transfer function f to the obtained representation of the central part in the spatial domain (SR);
vi) transforming the result of applying the transfer function back to the frequency domain (FR);
vii) multiplying the obtained representation of the result in the frequency domain (FR) with the interaction kernel (F);
viii) upsampling the result of multiplying with the interaction kernel (F);
ix) performing the remaining update steps in the up-sampled frequency domain (FR);
x) transforming the neural field a obtained from upsampling the result to the spatial domain (SR); and
xi) outputting an actual state of the neural field a transformed to the spatial domain,
wherein steps iii to viii are repeated k times before a new input is applied to the neural field a, k being a positive integer.

9. A robot, comprising a device according to claim 8 for processing signals from a visual sensor.

10. A vehicle comprising a device according to claim 8 for processing signals from a visual sensor.

11. The vehicle of claim 10, wherein the vehicle comprises an automobile.

12. The vehicle of claim 10, wherein the vehicle comprises an aircraft.

* * * * *